US006552534B2

(12) United States Patent
Desbiolles et al.

(10) Patent No.: US 6,552,534 B2
(45) Date of Patent: Apr. 22, 2003

(54) DEVICE FOR DETERMINING THE ABSOLUTE ANGULAR POSITION OF A TURNING COMPONENT

(75) Inventors: Pascal Desbiolles, Thorens Glieres (FR); Christophe Nicot, Epagny (FR)

(73) Assignee: The Torrington Company, Torrington, CT (US)

( * ) Notice: Subject to any disclaimer, the term of this patent is extended or adjusted under 35 U.S.C. 154(b) by 0 days.

(21) Appl. No.: 09/896,303

(22) Filed: Jun. 29, 2001

(65) Prior Publication Data

US 2002/0024336 A1 Feb. 28, 2002

(30) Foreign Application Priority Data

Jun. 30, 2000 (FR) .............................................. 00 08507

(51) Int. Cl.$^7$ .......................... G01B 7/30; G01D 5/244; B62D 15/02
(52) U.S. Cl. .............................. 324/207.25; 324/207.2; 180/400; 701/41; 702/151
(58) Field of Search .............................. 324/166, 207.2, 324/207.21, 207.25; 33/1 PT; 180/400; 701/41; 702/151; 318/652, 653, 470

(56) References Cited

U.S. PATENT DOCUMENTS

| 4,860,844 | A | * | 8/1989 | O'Neill | .................. | 180/402 |
|---|---|---|---|---|---|---|
| 5,065,324 | A | | 11/1991 | Oshita et al. | .......... | 364/424.05 |
| 6,118,271 | A | * | 9/2000 | Ely et al. | ............ | 324/207.25 X |
| 6,329,782 | B1 | * | 12/2001 | Chen et al. | .................. | 318/727 |

FOREIGN PATENT DOCUMENTS

| EP | 0 460 582 | 12/1991 |
|---|---|---|
| FR | 2 769 088 | 4/1999 |

* cited by examiner

*Primary Examiner*—Gerard R. Strecker
(74) *Attorney, Agent, or Firm*—Michael Best & Friedrich LLP

(57) ABSTRACT

A fixed magnetic sensor (16) is used to determine absolute angular position of a turning component (3, 4). A detection device (27) detects an angular position of a multipole magnetic ring (11) near a reference angular position. A resetting device (28) resets the angular position of the multipole magnetic ring (11) detected by detection device (27). The resetting device (28) is capable of assigning a value called "offset" to the value of the absolute angular position of the multipole magnetic ring (11). A determination device (29) determines the absolute angular position of the multipole magnetic ring (11) on all of the turns made by a turning component (3, 4) ascertained from the offset value and variations in the angular position.

19 Claims, 8 Drawing Sheets

DEVICE FOR DETERMINING THE ABSOLUTE ANGULAR POSITION OF A TURNING COMPONENT

BACKGROUND OF THE INVENTION

This invention relates generally to a device for determination of the absolute angular position of a turning component in relation to a fixed structure by means of a relative angular position sensor and, more particularly, to a system and procedure for measuring the absolute angular position of a steering wheel in relation to the frame of a vehicle containing such a device.

To facilitate the comprehension of the following for the reader, definitions are now given of the relative angular position, noted $\theta_r$, and the absolute angular position, noted $\theta_a$, of a turning component in relation to a fixed structure. Relative angular position $\theta_r$ of the turning component is understood to be the angle separating the position of the turning component at a given moment from any initial position of the latter in relation to the fixed structure; this initial position can vary from one measurement to the other in relation to the fixed structure. Absolute angular position $\theta_a$ is understood to be the angle separating the position of the turning component at a given moment from a reference position of the turning component, with this reference position being fixed in relation to the fixed structure.

Relative position sensors are known, consisting on the one hand of a multipole magnetic ring on which are magnetized several pairs of North and South poles, being mobile while rotating opposite a fixed magnetic sensor consisting of at least three sensing elements, respectively positioned opposite a main channel and "turn cue" reference channel and, on the other hand, a device for treating output signals produced by the sensing elements, designed to give a reference pulse per turn of rotation component integral with the multipole ring. This type of sensor is described in the document FR-A-2,769,088 under the name of the applicant. This type of sensor is entirely satisfactory for applications requiring only knowledge of the relative angular position of a turning component in relation to a fixed structure. On the contrary, this type of sensor does not make it possible to know the absolute position of the turning component when the latter makes several turns on itself.

Certain applications, such as the control systems for the path of a vehicle (of the ESP® type), require knowledge of the real angular position of the steering wheel in relation to a fixed median position in relation to the frame, in which the wheels of the vehicle are straight in relation to the latter. Sensors of the type described in the document FR-2,768,088 only make it possible to know the variations in the angular position of the steering wheel, but do not make it possible to know its absolute angular position corresponding to its real angular position. Absolute angle sensors of the optical or magnetic type and angle sensors of the multiturn type based on gears are known. The space required and the method of operating these types of sensors, however, require adapting the surrounding components, and do not meet the current requirements of automotive factories, especially in terms of space requirement and cost.

The foregoing illustrates limitations known to exist in present devices and methods. Thus, it is apparent that it would be advantageous to provide an alternative directed to overcoming one or more of the limitations set forth above. The invention aims especially to resolve the above-mentioned drawbacks of the prior art, by proposing a device for determination of the absolute angular position of a turning component in relation to a fixed structure by means of a relative angular position sensor, which has a reduced space requirement and cost in relation to existing devices, which is relatively simple to operate, and which is easily adaptable to the direction support systems and/or to current safety systems of vehicles.

SUMMARY OF THE INVENTION

In one aspect of the invention, this is accomplished by providing a device for determining the absolute angular position $\theta_a$ of a turning component in relation to a fixed structure by means of a relative angular position sensor $\theta_r$. A rotating mulipole magnetic ring, that may be integral with the turning component, is capable of making, jointly with the turning component, several turns around its axis of rotation from an angular position called the reference, said ring comprising a main channel and a reference channel called the "turn cue" channel, and with the main channel and "turn cue" channel being concentric on the magnetic ring. A fixed magnetic sensor, that may be integral with the fixed structure, is arranged opposite and away from a multipole ring by an air gap, and consists of at least three sensing elements, at least two of which are positioned opposite the main channel so as to produce two periodic electric signals A, B in quadrature. At least one of the three sensing elements is positioned opposite the reference channel so as to produce a reference electrical signal C called the "turn cue" signal in the form of an electric pulse per turn of the multipole encoder, with this pulse corresponding to an angular position called the "turn cue" angular position of the turning component in relation to the fixed structure, with the angular displacement between said reference angular position and said "turn cue" angular position being called "offset" (noted $\theta_{offset}$). A counting means for counting pulses derived from A, B signals is capable of enabling the determination of the relative angular position $\theta_r$ of the multipole ring and the variations of this relative angular position $\theta_r$.

This determination device also comprises a treatment device including detection means for detecting an angular position $\theta_0$ of the multipole ring near said reference angular position. A resetting means for resetting the absolute angular position $\theta_a$ of the multipole ring, detected by a detection means is capable of assigning, during detection of a pulse of the "turn cue" signal C, the offset value $\theta_{offset}$ to the value of the absolute angular position $\theta_a$ of the multipole ring in relation to its reference angular position. A determination means is provided for determining the absolute angular position $\theta_a$ of the ring on all of the turns made by the turning component, from the offset value $\theta_{offset}$ and variations in the relative angular position $\theta_r$. Moreover, this measurement is directly exploitable by the direction support systems, using the safety systems of a vehicle.

The foregoing and other aspects will become apparent from the following descriptionof the invention when considered in conjunction with the accompanying drawing figures.

BRIEF DESCRIPTION OF THE DRAWING FIGURES

Figure 3:
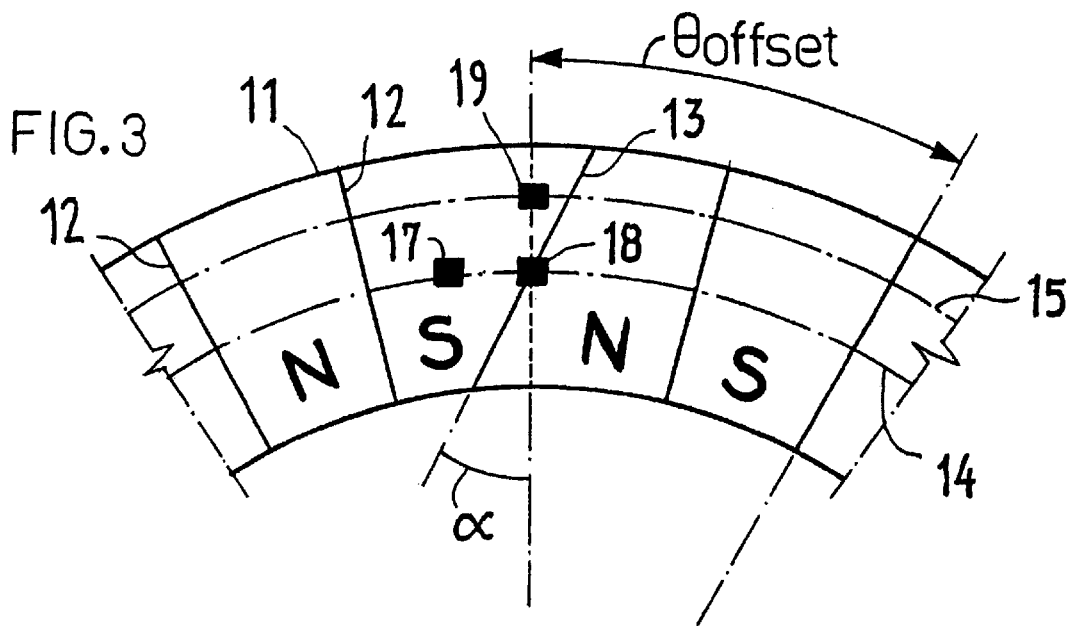
Figure 4:
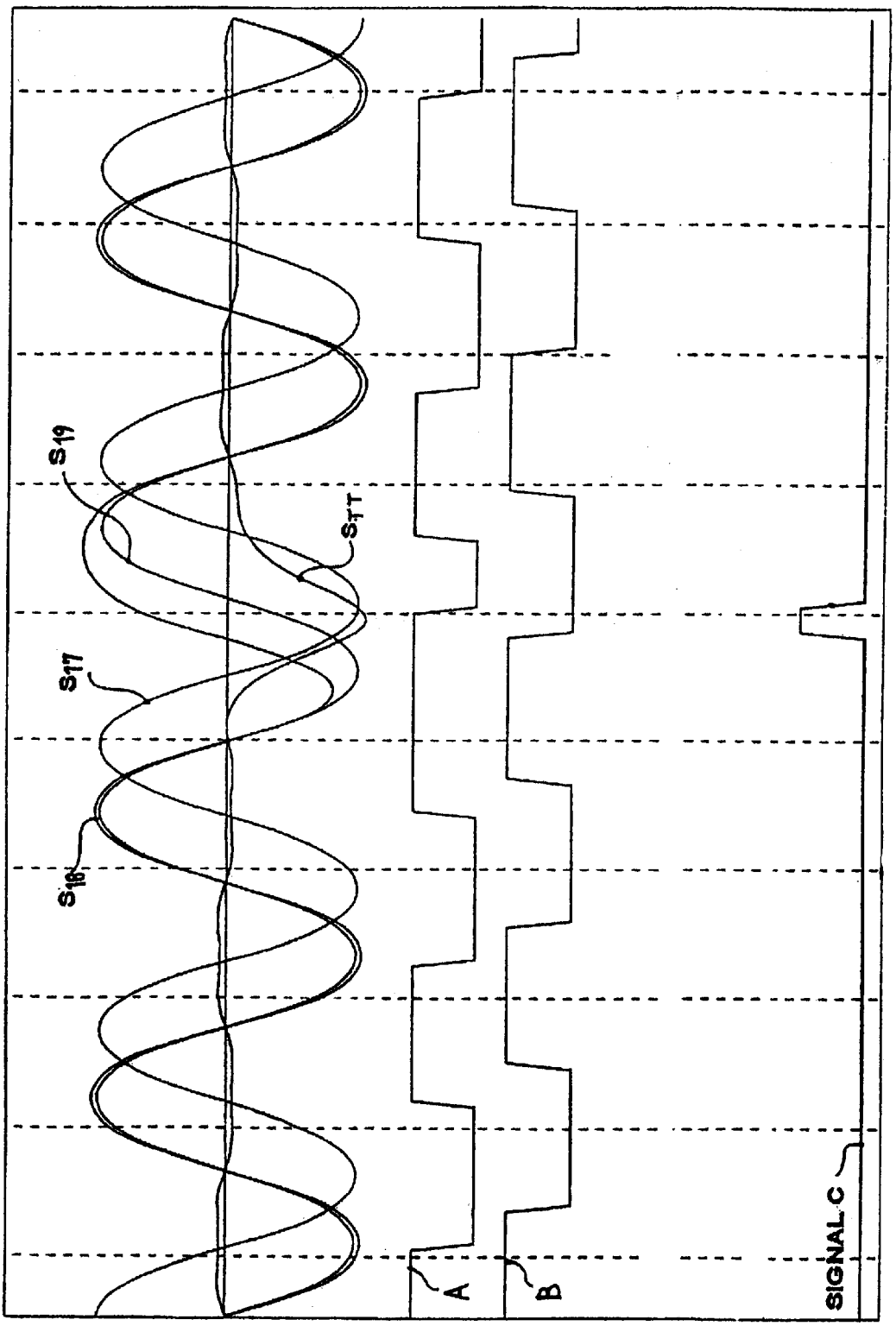
Figure 5:
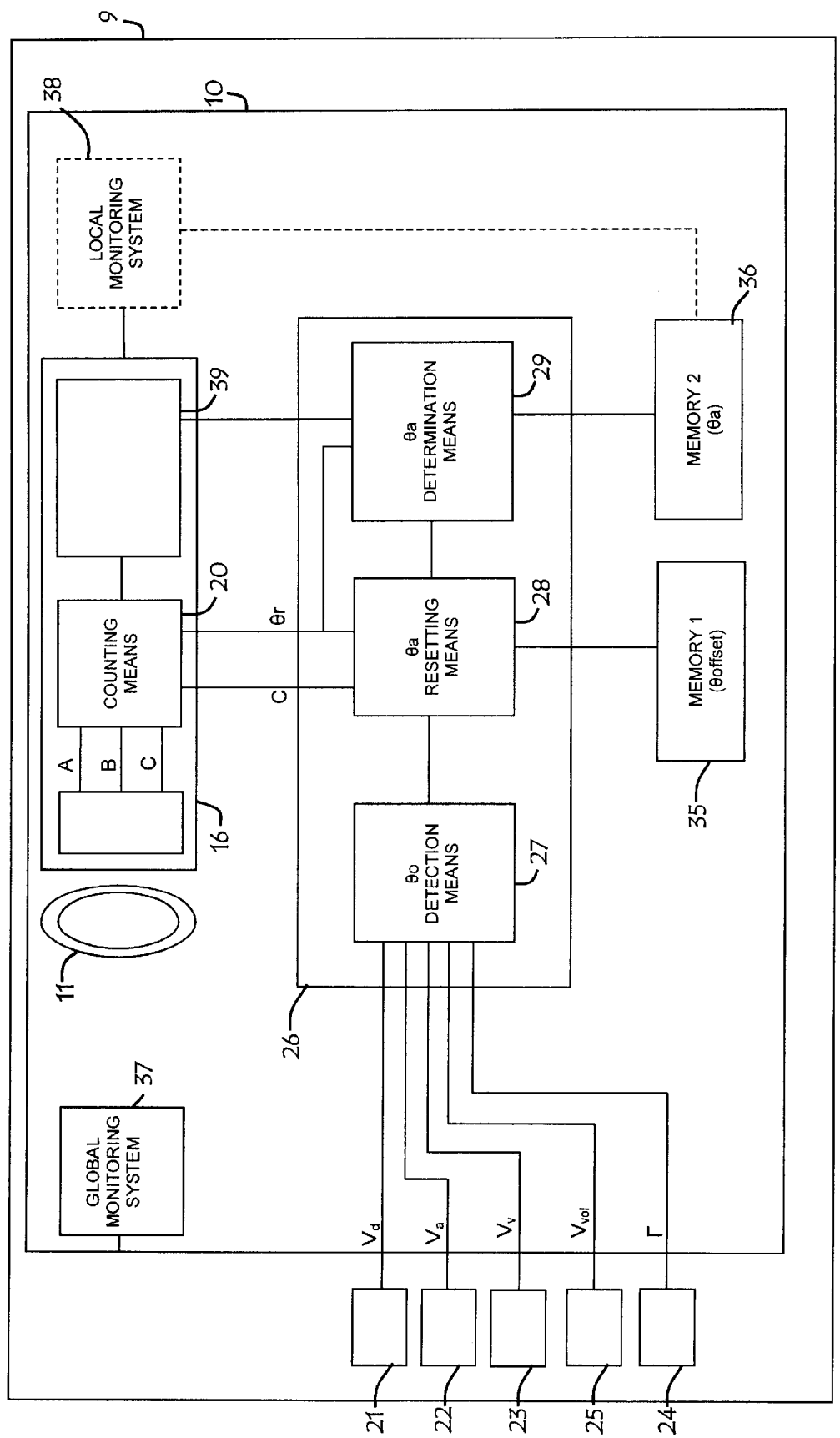
Figure 6:
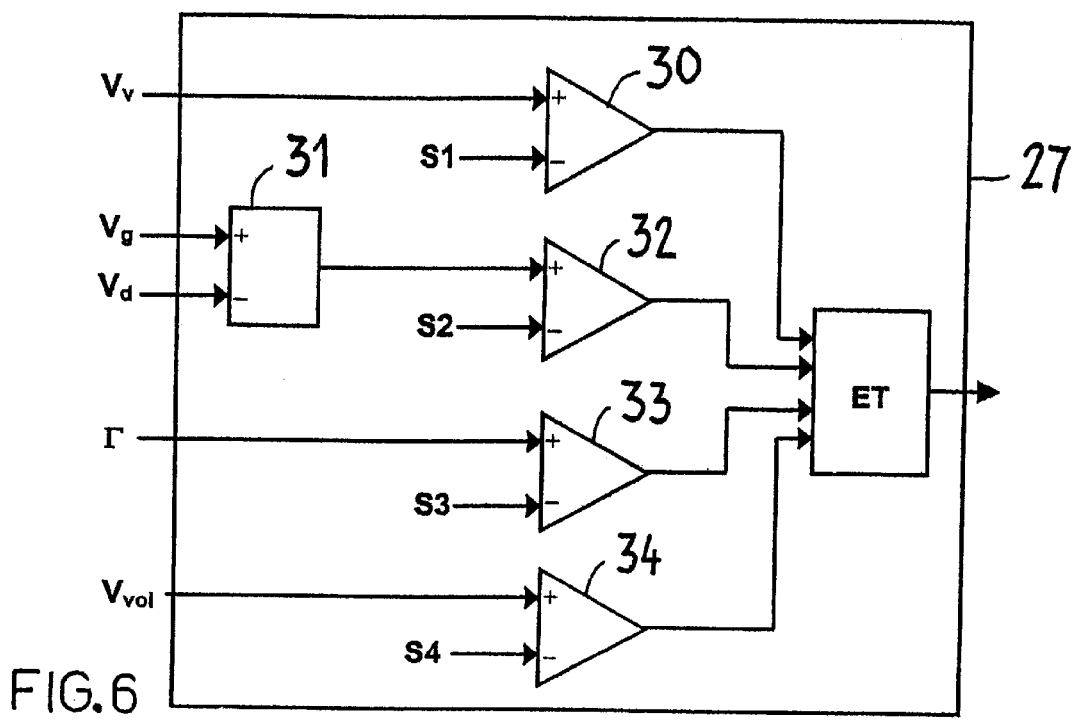
Figure 7:
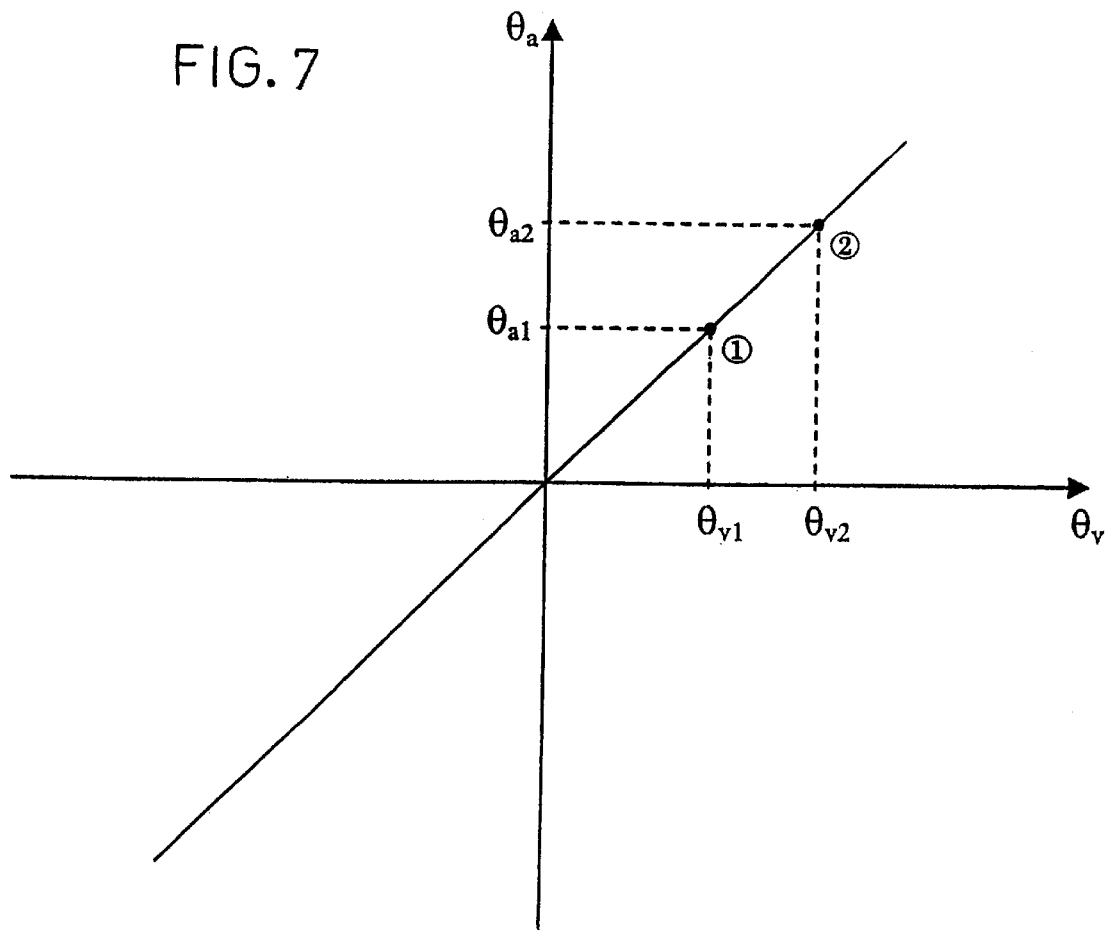
Figure 8:
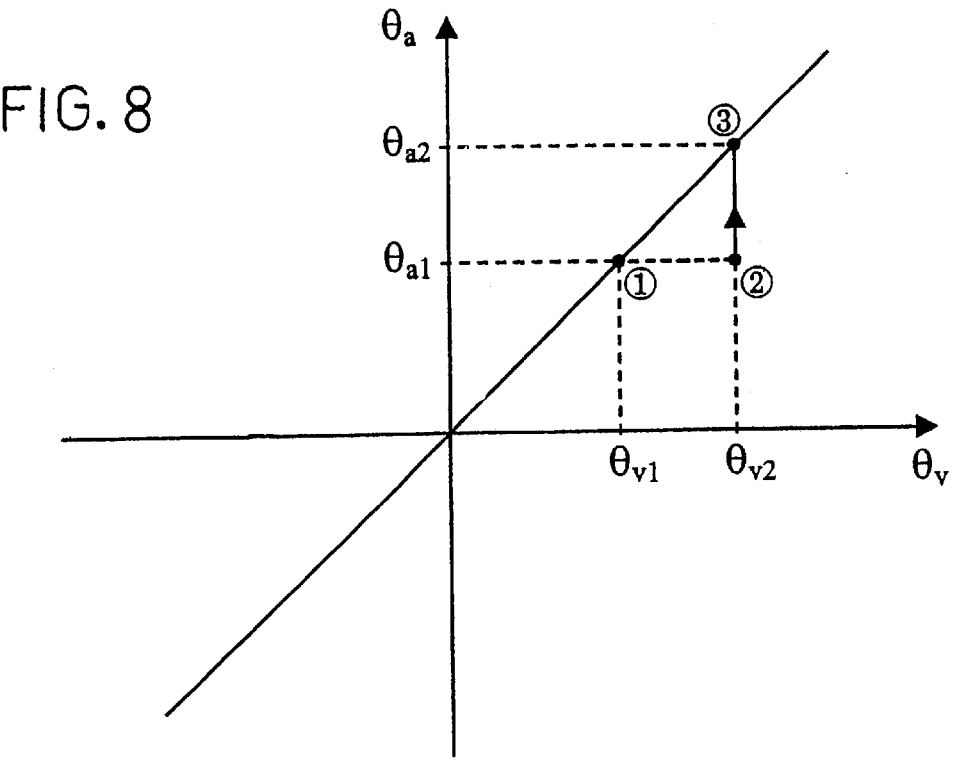
Figure 9:
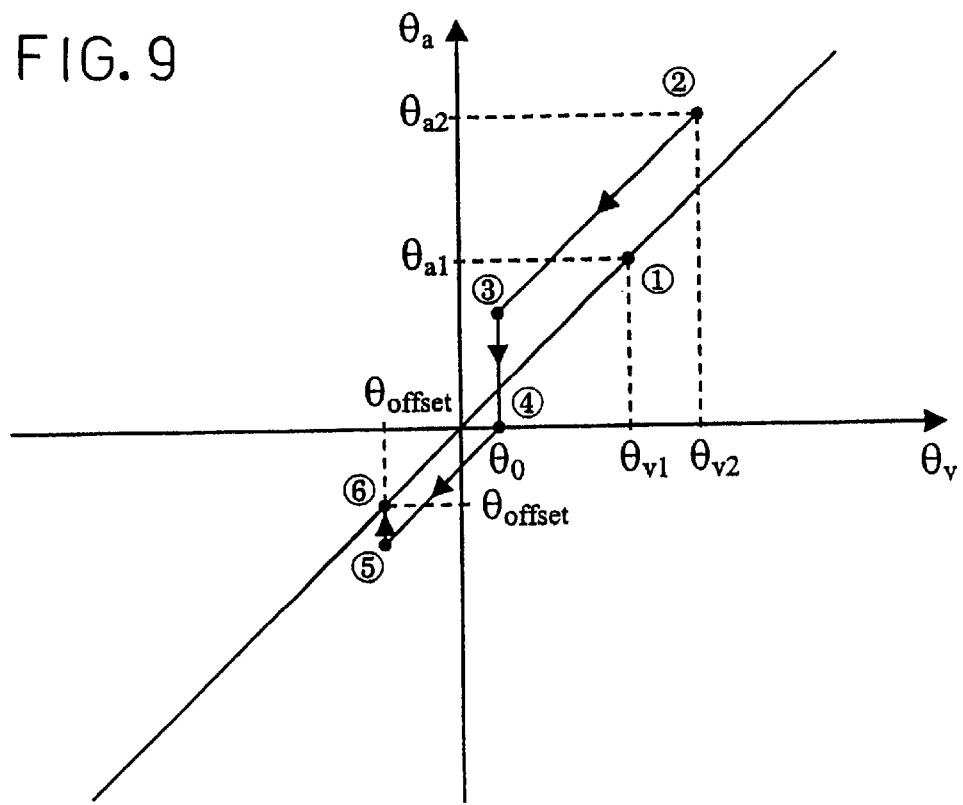
Figure 10:
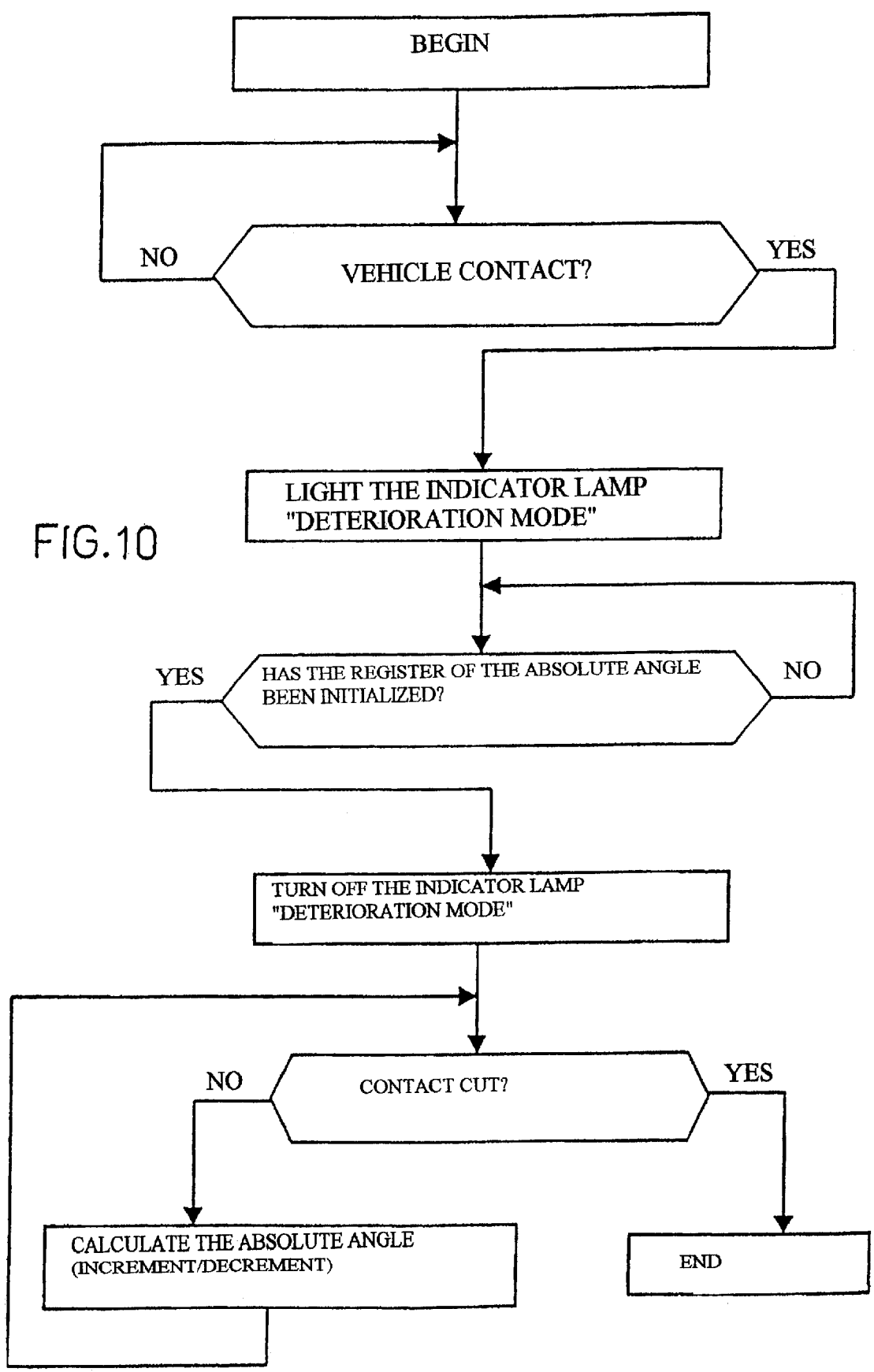
Figure 11:
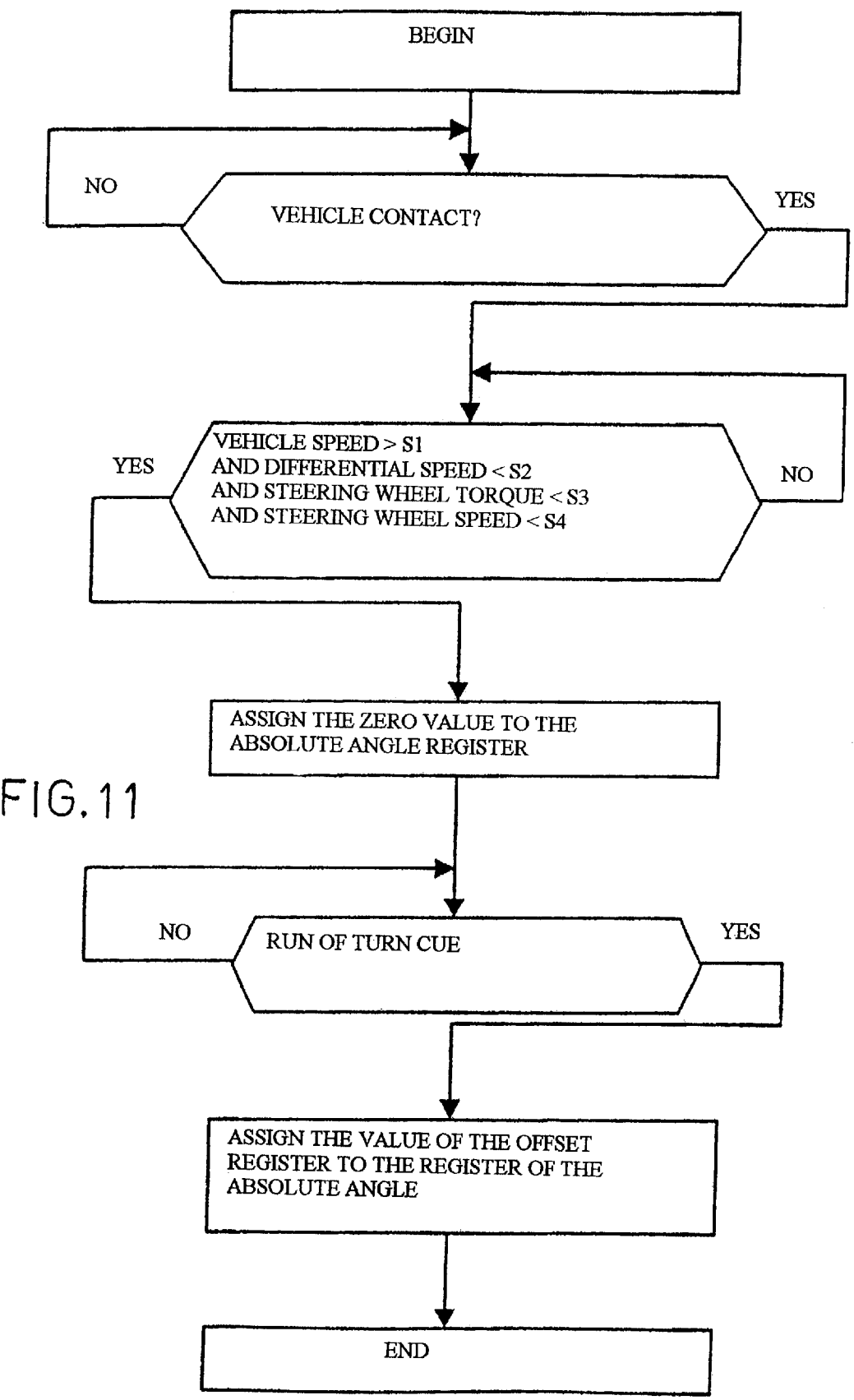

FIG. 3 shows a portion of the multipole magnetic ring on which are represented two pairs of North and South poles; two concentric channels are represented by dot-dash lines: an interior main channel and an exterior "turn cue" reference channel; three sensing elements of a sensor are also represented in the form of black squares; one of them is arranged opposite the "turn cue" channel, the other two are arranged opposite the main channel; the two pairs of poles are situated on either side of a magnetic singularity in the form of an oblique junction between a South pole and adjacent North pole; this singularity makes it possible to obtain a "turn cue" signal in the form of a pulse per turn of the ring;

FIG. 4 is a graphic representation of the electric signals derived from the sensor and corresponding square digital signals with the "turn cue" reference signal;

FIG. 5 is a diagrammatic representation of the measuring system according to the invention, making it possible to obtain the absolute angular position of the steering wheel;

FIG. 6 is a logic diagram illustrating an embodiment method of a condition necessary for enabling the reinitialization of the absolute position register;

FIG. 7 is a graph representing the absolute angular position of the multipole ring according to the real angular position of the turning component, and according to one embodiment method where the determination device consists of a global monitoring system; points ① and ② correspond to two successive steps for measuring the absolute angular position of the multipole ring;

FIG. 8 is a graph similar to the graph of FIG. 7, according to one embodiment method where the measuring device consists of a local monitoring system, with points ①, ② and ③ corresponding to three successive steps of measuring the absolute angular position of the multipole ring;

FIG. 9 is graph similar to the graphs of FIGS. 7 and 8, illustrating the procedure of reinitialization of the absolute angle register;

FIG. 10 is a diagram illustrating steps of a reinitialization program of the register of the absolute angular position; and FIG. 11 is a diagram illustrating steps of a subprogram making it possible to reinitialize the register of the absolute position.

DETAILED DESCRIPTION

Figure 1:
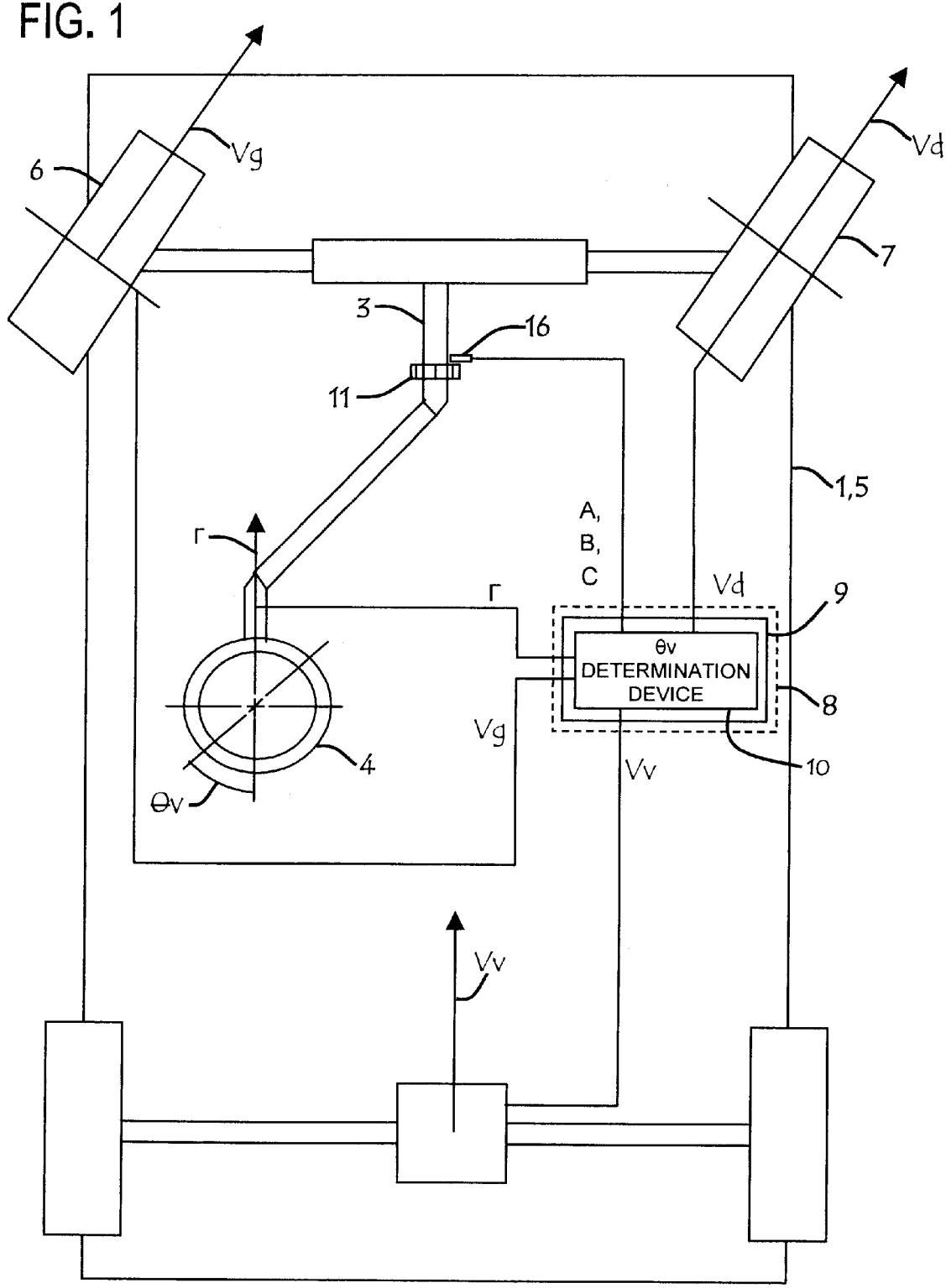
FIG. 1 is a diagrammatic representation of a vehicle displayed in a turn; this vehicle consists of a safety system consisting of a measuring system connected to different components of the vehicle, especially the steered wheels and the steering shaft; this measuring system enables calculation of the absolute angular position of the steering wheel controlling the steering shaft.

FIG. 1 shows a vehicle 1 running with a linear speed $V_{v1}$ consisting of a steering system 2 which includes a steering shaft 3 controlled by a steering wheel 4, with the shaft 3 and the wheel 4 being mounted so that they turn relative to the frame 5 of the vehicle 1. In a straight line, the left 6 and right 7 steered wheels of the vehicle 1 are assumed to be parallel; their respective moving speeds, noted $V_g$ and $V_d$, are equal to the speed $V_v$ of the vehicle 1.

When a torque Γ is applied to the axis of the steering wheel 4, this turns around its axis to assume an angular position $\theta_v$. The angular position $\theta_v$, which is the real angular position of the steering wheel, is assumed to be:

zero when vehicle 1 runs in a straight line, with no torque being applied to the steering wheel 4; the steering wheel 4 is then in an angular position called equilibrium, fixed in relation to frame 5;

absolutely positive when a torque Γ is applied to the steering wheel 4 to place vehicle 1 in a right turn, with the left wheel speed $V_g$ then being absolutely greater than the speed of the right wheel $V_d$;

absolutely negative when a torque Γ is applied to the steering wheel 4 to place the vehicle 1 in a left turn, with the speed of the left wheel $V_g$ then being absolutely less than the speed of the right wheel $V_d$.

In the continuation of the description, the angular positions are expressed in radians. Remember that an angular measurement with a value of 1 radian corresponds to an angular measurement of approximately 57.2957 degrees; an angular measurement of $2\pi$ radians corresponds to an angular measurement of 360 degrees (that is, a complete turn). One assumes for simplification that the steering wheel 4 can make four complete turns on itself: two turns to the left from its equilibrium position towards a position of maximum left steering (where $\theta_v=-4\pi$) and two turns to the right from the equilibrium position to a position of maximum right steering (where $\theta_v=+4\pi$).

From the preceding it is understood that $\theta_v$ is an absolute angular position of the steering wheel 4 in relation to the frame 5, between $-4\pi$ and $+4\pi$. It is desired to obtain a precise measurement of this angular position $\theta_v$. In fact, this angular position $\theta_v$ can be required by a safety system 8 such as a traction control system, antilock brake system, roll control system, or even a navigation support system.

For this purpose, the vehicle is equipped with a measuring system 9 especially capable of using a procedure for determining the angular position $\theta_v$. This measuring system 9 includes a device 10 for determination of the angular position $\theta_v$, which comprises a rotating mobile circular multipole magnetic ring 11 mounted on the steering shaft 3 or on the center of the steering wheel 4 and integral with the latter to make, jointly with it, several turns on itself around its axis of rotation, noted R. Thus, the multipole ring 11 is capable of making 4 complete turns jointly with the steering wheel 4.

$\theta_a$ is noted as the absolute angular position (also called the absolute angle) of the multipole ring 11, forming a measurement of the real angular position $\theta_v$ of the steering wheel 4. This absolute angular position $\theta_a$ is arbitrarily defined in relation to an angular position called the reference, fixed in relation to the frame 5 corresponding to the equilibrium position of the steering wheel 4, in which $\theta_a$ is zero by definition, such that $\theta_a$ is equal to $\theta_v$, permanently.

Figure 2:
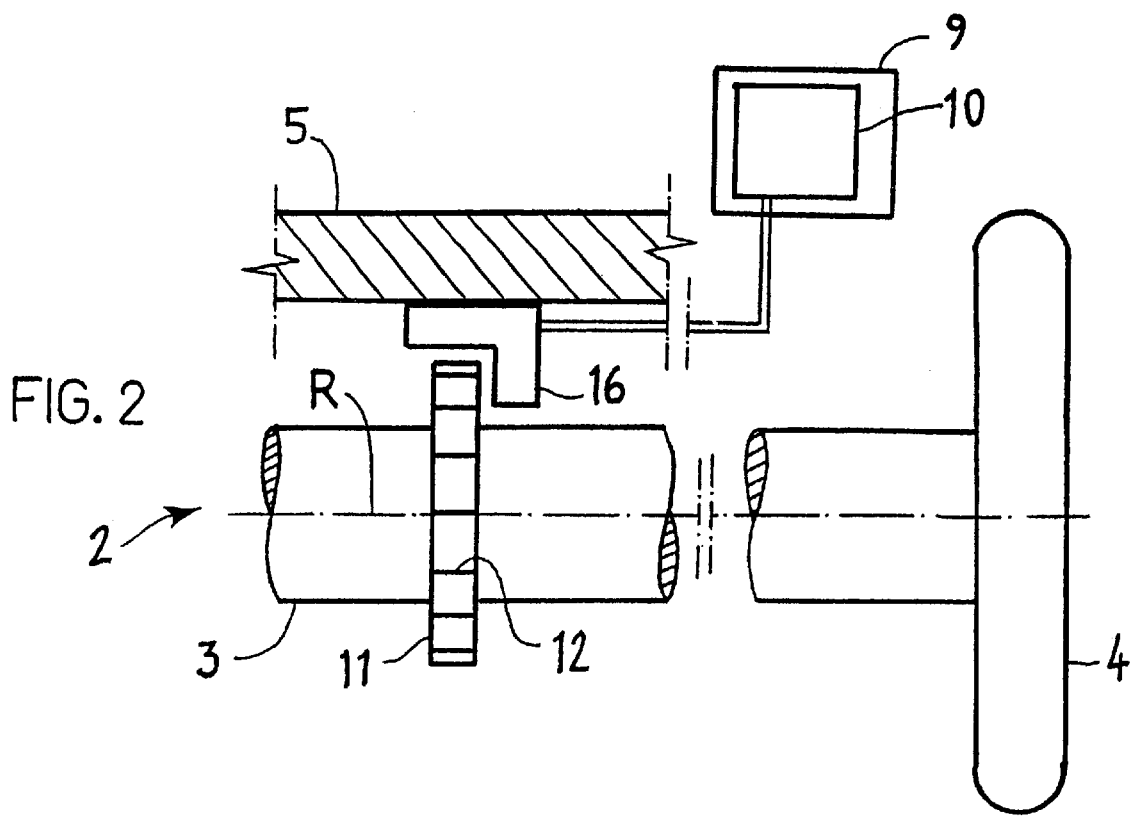
FIG. 2 is a diagrammatic view of a detail of FIG. 1; a multipole magnetic ring is mounted on the steering shaft of the vehicle, whereas a sensor is mounted on the frame by being arranged opposite the multipole ring.

Now, a way of measuring the variations in the absolute angular position $\theta_a$ is described. Referring to FIG. 2, the ring 11 consists of several pairs of adjacent North and South poles, the junctions 12 of which are spread radially, except for one of them, called singular junction 13, which forms, for example, an angle a with a radial direction. Two concentric magnetic channels are defined on the ring 11: an interior main channel 14 and an exterior reference channel 15 called the "turn cue."

Referring to FIGS. 2 and 3, a relative angular magnetic position sensor 16, fixed, integral with the frame 5 and integrated with device 10, is arranged opposite the multipole ring 11. This sensor 16 comprises at least three sensing elements, at least two of which 17, 18 are positioned opposite the main channel 14 and at least one 19 opposite the "turn cue" channel 15. The sensing elements 17, 18, 19 are, for example, Hall-effect probes and produce electric signals noted respectively S17, S18, S19, represented in FIG. 4.

The electronic treatment of these signals S17, S18, S19 within sensor 16 makes it possible to obtain two square digital signals A and B in quadrature, as well as a "turn cue" reference digital signal C. The sensor 16, for example, evaluates the analog difference between the signals S19 and S18 by means of a differentiator for producing a "turn cue" reference analog signal $S_{TT}$, compared to a reference fixed threshold by means of a comparator to obtain the "turn cue" digital signal C.

The principle of obtaining digital signals A, B, C as well as different embodiment methods of the magnetic ring 11 and sensor 16 are described in more detail in the patent application No. FR-2,769,088 under the name of the applicant.

In order to measure an angular position of the multipole ring 11, called relative, noted $\theta_r$ in relation to an initial position in which the ring 11 is found, for example during the starting of vehicle 1, the device 10 comprises a means of counting 20 pulses from signals A or B, for example, integrated with the sensor 16 as illustrated in FIG. 5. This counting means 20 comprises, for example, a register in which the value of the relative position $\theta_r$ is incremented or decremented according to the pulses detected. The variations in the relative angular position $\theta_r$ are identical to the variations in the absolute angular position $\theta_a$.

In order to obtain an exact measurement of the absolute angular position $\theta_a$, an initial value of $\theta_a$ is determined, with the later variations of the position $\theta_a$ being determined by the sensor 16. For this purpose, the measuring procedure of $\theta_a$ includes an initialization procedure that may be used before the first running of the vehicle 1, with the means for storing the value of $\theta_a$ between two contact cutoffs then being provided.

According to one variant, this procedure can be carried out after each startup of the vehicle with no means for storing the value of $\theta_a$ between two contact cutoffs being provided (since the initialization of $\theta_a$ is recurrent, it is called reinitialization). This initialization procedure, or reinitialization, can be carried out in the following way. Firstly, an angular position of the steering wheel 4 near the equilibrium position is detected, that is, an absolute angular position $\theta_0$ of the ring 11 near the reference angular position, which indicates that the wheels of the vehicle 1 are straight.

This detection can comprise the following steps:
  speed $V_v$ of the vehicle 1 is measured (for example, by weighting the speeds of the wheels) and it is compared to a first threshold value S1, for example, on the order of 10 km per hour;
  speeds $V_g$, $V_d$ of the left and right steered wheels are measured;
  the absolute value $V_{dif}$ of the difference $V_g-V_d$ between the speeds of the wheels is calculated; this value is compared to a second threshold value S2, for example, on the order of 1 km per hour.

It is postulated that the absolute angular position $\theta_a$ is equal to $\theta_0$ if the following conditions are met simultaneously:

$V_v$>S1 and $|V_{dif}|$<S2.

Moreover, the detection procedure can include a step with provision for the torque Γ applied to the steering wheel 4, comparing it to a third threshold value S3, for example, on the order of 1 Newton-meter. The absolute angular position $\theta_a$ of the ring 11 is then postulated to be approximately equal to $\theta_0$ if the three following conditions are met simultaneously:

$V_v$>S1, $|V_{dif}|$<S2, and Γ<S3.

In addition, the detection procedure can include an additional step with provision for measuring the rotating speed $V_{vol}$ of the steering wheel 4 comparing it to a fourth threshold value S4, for example, on the order of 0.2 radian per second. The absolute angular position $\theta_a$ of the ring 11 is then postulated to be approximately equal to $\theta_0$ if the four following conditions are met simultaneously:

$V_v$>S1, $|V_{dif}|$<S2, Γ<S3, and $V_{vol}$<S4.

Vehicle 1 is then postulated to run at a speed higher than S1, approximately in a straight line. Since position $\theta_0$ is detected, the value of the reference angular position (with the occurrence of a zero value) is assigned to the value of the absolute angular position $\theta_a$ of the multipole ring 11.

The initialization, or reinitialization, procedure secondly provides for the detection of a "turn cue" pulse called the reference, defined in the following way. A complete turn of the steering wheel 4 or multipole ring 11 separates two successive "turn cue" pulses. From the left steering position to the right steering position, the sensor 16 detects 4 successive "turn cue" pulses.

A value of the absolute position called the "turn cue" reference angular position corresponds to the pulse angularly nearest the reference angular position of the multipole ring 11. To simplify the continuation of the description it is postulated that this pulse is detected by turning the steering wheel 4 to the right from its position of equilibrium. Of course, in variants, this pulse can be detected by turning the steering wheel 4 to the left. It is called "offset" and the angular displacement between the "turn cue" reference angular position and the reference angular position is noted as $\theta_{offset}$.

It is mechanically possible to mount the multipole ring 11 such that the "turn cue" absolute angular position corresponds to the reference position, with the offset $\theta_{offset}$ then being zero. However, the applicant has noted that this mechanical positioning is difficult to perform systematically and reliably in the context of production of a large series, with the offset $\theta_{offset}$ not being zero in the large majority of the cases.

It therefore appears easier to store the offset value $\theta_{offset}$ during assembly of the vehicle 1 in the factory. After detection of the reference "turn cue" pulse, the initialization procedure provides for assigning the offset value $\theta_{offset}$ to the value of the absolute angular position $\theta_a$. The absolute angular position $\theta_a$ is thus initialized—or reinitialized. To determine the offset value $\theta_{offset}$, for example, before first running of the vehicle 1, one proceeds in the following way:
  with vehicle 1 positioned on a rolling bench for checking that the wheels 6, 7 are parallel, wheels 6, 7 are made to be straight;
  the zero value is assigned to the relative angular position value;
  the steering wheel is turned to the left and/or right so as to detect the "turn cue" pulse; the offset value $\theta_{offset}$ of the relative angular position corresponds to the detection of this pulse.

To subsequently determine the absolute angular position at any instant, the signals A, B are continuously counted with the aid of counting means 20; any variation in the relative angular position $\theta_r$ is reflected in the value of the absolute angular position $\theta_a$.

In order to make it possible to use the reinitialization procedure, with reference to FIG. 5, the measuring system 9 comprises:
  measuring means 21, 22 of the speed $V_d$, $V_g$ of the steered wheels 6, 7;
  measuring means 23 of the speed $V_v$ of the vehicle.
Measuring system 9 can in addition comprise:
  measuring means 24 of the torque Γ applied to the steering wheel 4; and
  measuring means 25 of the rotating speed $V_{vol}$ of the steering wheel 4.

Measuring system 9 also comprises a treatment device 26 including:

detection means 27 of the angular position $\theta_0$;

resetting means 28 of the absolute angular position $\theta_a$ of the multipole ring 11, run by detection means 27 and capable of assigning the offset value $\theta_{offset}$ to the absolute angular position $\theta_a$ during detection of the "turn cue" reference pulse; and determination means 29 of the absolute angular position $\theta_a$, ascertained from the offset value $\theta_{offset}$ and variations in the relative angular position $\theta_r$ measured by the sensor 16.

The determination means 29 is connected to the resetting means 28 and to the counting means 20 as shown in FIG. 5.

According to one embodiment method, the resetting means 28 is constructed to assign the reference value (zero) to the absolute position value $\theta_a$ during the detection of the angular position $\theta_0$. The resetting means 28 is connected to the counting means 20 and to the detection means 27, with the latter themselves being connected to the measuring means 21 to 25.

In order to enable detection of the angular position $\theta_0$, the detection means 27 comprises:

first comparator means 30 of the speed $V_v$ of the vehicle at the first threshold value S1;

differentiation means-31 of the speeds $V_d$, $V_g$ of the right and left wheels and of second comparator means 32 of the absolute value $V_d$ if the difference in the speeds $V_d$, $V_g$ at the second threshold value S2;

The detection means 27 can in addition comprise:

third comparator means 33 of the torque $\Gamma$ applied to the steering wheel 4 at the third threshold value S3; and fourth comparator means 34 of the speed of the steering wheel $V_{vol}$ at the fourth threshold value S4.

According to one embodiment method, the treatment device 26 is an electronic circuit consisting of subsystems forming detection means 27, resetting means 28, and determination means 29 of the absolute position $\theta_a$. An embodiment example of the detection means is illustrated in FIG. 6.

According to another embodiment method (not shown), the treatment device 26 is a microcontroller containing a main program that consists of at least three subprograms forming, respectively, detection means 27, resetting means 28, and determination means 29 of the absolute angular position $\theta_a$. The microcontroller 26 is constructed to receive signals from the sensor 16 on the one hand and signals from measuring means 21 to 25 on the other hand.

The offset value $\theta_{offset}$ can be stored in a first memory 35 of the EEPROM type, connected to the microcontroller 26 forming an offset register. At any instant, the offset value $\theta_{offset}$ can, as far as it is concerned, be introduced into an incremental register integrated with microcontroller 26. The value $\theta_a$ can in addition be stored, especially before a contact cutoff, in a second memory 36 of the EEPROM or flash memory type, connected to the microcontroller 26 and forming a register of absolute angular position $\theta_a$.

According to one embodiment method, the initialization procedure illustrated in the diagram of FIG. 11 is carried out during each startup of the vehicle 1, with the value of the absolute angular position $\theta_a$ not being stored during a contact cutoff of the vehicle 1. The initialization procedure can be indicated to the driver of the vehicle 1.

When the contact of the vehicle 1 is detected, the treatment device 26 controls, for example, the lighting of an indicator lamp on the instrument panel of vehicle 1, indicating to the driver that his vehicle 1 operates for the time being in a "deteriorated" mode, that is, the measuring system 9 is for the time being incapable of measuring the absolute angular position $\theta_a$ of the steering wheel 4 (however, the measurement of the relative angular position $\theta_r$ remains possible in this deteriorated mode). The treatment device 26 then controls the reinitialization of the register of the absolute angular position $\theta_a$. Once this operation is carried out, the program orders the indicator lamp to be turned off; until the motor is stopped by contact cutoff, the measuring system 9 calculates at any instant the absolute angular position $\theta_a$ of the ring 11 (FIG. 10).

According to another embodiment method, it is not necessary to proceed with the systematic reinitialization of the absolute angular position $\theta_a$. According to a first variant, the determination device 10 consists of a global monitoring system 37, see FIG. 5, that permanently supplies current to the sensor 16 and the treatment device 26—including during a contact cutoff of the vehicle 1. In this way, the measurement of the absolute angular position $\theta_a$ is made permanently, independently of the running state of the vehicle 1.

For this purpose, the global monitoring system 37 is, for example, connected to the storage battery of the vehicle 1, which supplies current to it. Thus, any action on the steering wheel 4, even when the vehicle 1 is not operating, causes a variation in the absolute angular position $\theta_a$. In this embodiment method, the counting means 20 can be integrated with the microcontroller 26.

This first variant is illustrated in the graph of FIG. 7, which represents the absolute angular position $\theta_a$ of the multipole ring 11 according to the real angular position $\theta_v$ of the steering wheel 4. At an instant ① immediately preceding the contact cutoff of the vehicle 1, the steering wheel 4 is in an angular position $\theta_{v1}$, to which the measurement $\theta_{a1}$ of the angular position of the multipole ring 11 corresponds. At an instant ② immediately following a new contacting of the vehicle, the steering wheel 4 is in an angular position $\theta_{v2}$ to which corresponds a measurement $\theta_{a2}$ of the angular position of the multipole ring 11, with the variation $\theta_{a2}-\theta_{a1}$ of the absolute angular position $\theta_a$ having been measured during a period of contact cutoff.

According to a second variant, the determination device 10 consists of a local monitoring system 38 that permanently supplies current to the sensor 16, including during contact cutoff of the vehicle 1. For this purpose, the local monitoring system 38 is for example connected to the storage battery of the vehicle 1, which supplies current to it.

This second variant is illustrated in FIG. 8, which is a graph representing the absolute angular position $\theta_a$ of the multipole ring 11 according to the real angular position $\theta_v$ of the steering wheel 4. At an instant ① immediately preceding the contact cutoff of the vehicle 1, the steering wheel 4 is in an angular position $\theta_{v1}$, to which a measurement $\theta_{a1}$ of the angular position of the multipole ring 11 corresponds. During contact cutoff, the value of $\theta_{a1}$ is stored in the second memory 36 (register of the absolute angle), which can be supplied with current by the local monitoring system 38 at least during this storing. The variations of the relative angular position $\theta_r$ (equal to the variations in the absolute angular position $\theta_a$) are measured by the sensor 16 and incremented in a register 39.

At an instant ② immediately following a new contacting of the vehicle 1, the steering wheel 4 is in an angular position $\theta_{v2}$, whereas the register of the absolute angle has stored the value $\theta_{a1}$. At an instant ③ the determination means then reflect the variation in the relative angular position $\theta_r$ (equal to the variation in the real position $\theta_{v2}-\theta_{v1}$) on the value of the absolute angular position $\theta_a$ and assign a corresponding value $\theta_{a2}$ to the value of the absolute angular position. In this way, a variation in the real position $\theta_v$ of the steering wheel 4 when the vehicle 1 is not functioning does not cause any defect in measuring the absolute angular position $\theta_a$ during the following startup of the vehicle 1.

It can happen that the monitoring system, which may be global 37 or local 38, in its turn is switched off or not operating especially when the storage battery of the vehicle no longer functions (when it is discharged or disconnected to be changed). The values of the relative $\theta_r$ and absolute $\theta_a$ angular positions are then lost. The measuring system 9 then proceeds with the reinitialization of the register of the absolute angle, for example, according to the reinitialization procedure described above.

This reinitialization is moreover illustrated in the graph of FIG. 9, which represents the absolute angular position $\theta_a$ of the multipole ring according to the real angular position $\theta_v$ of the steering wheel 4. At an instant ① immediately preceding the contact cutoff of the vehicle 1, the steering wheel 4 is in an angular position $\theta_{v1}$, to which a measurement $\theta_{a1}$ of the angular position of the multipole ring 11 corresponds. At an instant ② immediately following a new contacting of the vehicle 1, the steering wheel 4 is in an angular position $\theta_{v2}$, while the register 36 of the absolute angle contains any $\theta_{a2}$ value.

The variations in the relative position $\theta_r$ of the multipole ring 11 measured by the sensor 16 are reflected in the absolute angular position $\theta_a$ up to instant ③, where the value $\theta_0$ is detected near the reference angular position. At an instant ④ immediately following instant ③, the resetting means 28 then assigns the value of the reference angular position (zero) to the absolute angular position $\theta_a$. The variations in the relative position $\theta_r$ of the multipole ring 11 measured by the sensor 16 are reflected in the absolute angular position $\theta_a$ up to an instant ⑤, where the reference "turn cue" pulse is detected.

At an instant ⑥ immediately following instant ⑤, the steering means 28 then assigns the offset value $\theta_{offset}$ to the absolute angular position $\theta_a$. Afterwards, the variations in the relative position $\theta_r$ of the multipole ring measured by the sensor 16 are reflected on the absolute angular position $\theta_a$ up to the following contact cutoff. The reinitialization of the absolute angular register position can be provided while the vehicle 1 is stationary.

Before the battery (or any other device supplying the monitoring system 37, 38 with current) is disconnected, the steering wheel 4 is put in a position near its equilibrium position. The battery is disconnected, then the steering wheel 4 is turned so that the reference turn cue position is detected. The offset value $\theta_{offset}$ contained in the first memory 35 is then assigned to the value of the absolute angular position $\theta_a$.

Although the measurement of the absolute position $\theta_a$ has been applied in the present description to a steering wheel 4 turning in relation to the frame 5 of a vehicle 1, this measurement is applicable to any type of turning component in relation to a fixed structure. In particular, the multipole ring can be mounted on a turning collar of a ball bearing or roller bearing, with the sensor being mounted, for example, on the fixed collar.

From the present invention, it is possible to obtain, from a relative angular position sensor, a measurement of the absolute position without providing for a bulky system or making a significant modification to the turning component or to the fixed structure.

Having described the invention, what is claimed is:

1. A device (10) for determination of absolute angular position ($\theta_a$) of a turning component (3, 4) in relation to a fixed structure (5) by means of a sensor (16) of relative angular position ($\theta_r$), comprising:
   a rotating mobile circular multipole magnetic ring (11), designed to be integral with a turning component (3, 4), with the multipole ring (11) being capable of making, jointly with the turning component (3, 4), several turns around its axis of rotation (R) from an angular position called the reference position, said ring (11) comprising a main channel (14) and a reference channel (15) called the "turn cue" channel, the main channel (14) and the "turn cue" channel (15) being concentric on the magnetic ring (11);
   a fixed magnetic sensor (16), arranged opposite and away from multipole ring (11) by an air gap, and consisting of at least three sensing elements (17, 18, 19) at least two (17, 18) of which are positioned opposite the main channel (14) so as to produce two periodic electric signals (A, B) in quadrature and at least one (19) positioned opposite the reference channel (15) so as to produce a reference electrical signal (C) called the "turn cue" signal in the form of an electric pulse per turn of the multipole ring (11), with this pulse corresponding to an angular position called the "turn cue" angular position of the turning component (3, 4) in relation to the fixed structure (5), with the angular displacement between said reference angular position and said "turn cue" angular position being called "offset" ($\theta_{offset}$);
   counting means (20) for counting pulses derived from signals (A, B) capable of enabling the determination of relative angular position ($\theta_r$) of the multipole ring (11) and variations of this relative angular position ($\theta_r$); and
   a treatment device (26) comprising:
      detection means (27) for detecting an angular position ($\theta_0$) of the multipole ring (11) near said reference angular position;
      resetting means (28) for resetting the absolute angular position ($\theta_a$) of the multipole ring (11), driven by detection means (27) capable of assigning, during detection of a pulse of the "turn cue" signal (C), the offset value ($\theta_{offset}$) to the value of the absolute angular position ($\theta_a$) of the multipole ring (11) in relation to its reference angular position; and
      determination means (29) for determining the absolute angular position ($\theta_a$) of the ring (11) on all of the turns made by the turning component (3, 4) ascertained from the offset value ($\theta_{offset}$) and variations in the relative angular position ($\theta_r$).

2. A device according to claim 1, wherein the resetting means (28) is constructed to assign said reference value to the value of the absolute position ($\theta_a$) during the detection of the angular position ($\theta_0$) near the reference value.

3. A device according to claim 1, wherein the treatment device (26) comprises a microcontroller capable of receiving signals produced by the sensor (16).

4. A device according to claim 3, further comprising a first memory (35) of the EEPROM or flash memory type, capable of storing the offset value ($\theta_{offset}$), connected to said microcontroller (26).

5. A device according to claim 3, wherein the treatment device (26) comprises a second memory (36) of the EEPROM or flash memory type, capable of storing the value of the absolute position ($\theta_a$) of the multipole ring (11) in relation to its reference angular position.

6. A device according to claim 1, comprising a monitoring system called "local" (38) capable of permanently supplying the sensor (16) with current to keep it operating.

7. A device according to claim 1, comprising a monitoring system called "global" (37) capable of permanently supplying the sensor (16) and the treatment device (26) with current to enable calculation of the absolute angular position ($\theta_a$) of the multipole encoder (11) at any instant.

8. A measuring system (9) for measuring absolute angular position ($\theta_a$, $\theta_v$) of a steering wheel (4) of a vehicle (1) in relation to a frame (5) of the vehicle (1), comprising a device (10) according to claim 1, with the multipole magnetic ring (11) being integral with the steering wheel (4), the magnetic sensor (16) being integral with the frame (5), said measuring system (9) also comprising means of measuring (23) the speed of the vehicle and means of measuring (21, 22) the speed ($V_d$, $V_g$) of the steered wheels (6, 7) of the vehicle (1), with the detection means (27) comprising a means of differentiation (31) of these speeds ($V_g$, $V_d$).

9. A measuring system (9) according to claim 8, wherein the detection means (27) comprises a first comparator means (30) of the speed of the vehicle at a first threshold value (S1), and a second comparator means (32) of absolute value of the difference ($V_{dif}$) of speeds ($V_g$, $V_d$) of the wheels (6, 7) at a second threshold value (S2).

10. A measuring system (9) according to claim 8, further comprising a means for measuring (24) the torque ($\Gamma$) applied to the steering wheel (4), with the detection means (27) comprising a third comparator means (33) of the value of the torque ($\Gamma$) at a third threshold value (S3).

11. A measuring system (9) according to claim 8, further comprising a means for measuring (25) the rotating speed ($V_{vol}$) of the steering wheel (4), with the detection means (27) consisting of a fourth comparator means (34) of the value of the rotating speed ($V_{vol}$) at a fourth threshold value (S4).

12. A measuring method for measuring the absolute angular position of a steering wheel (4) of a vehicle (1) in relation to its frame (5), by means of a measuring system (9) according to claim 8, comprising an initialization procedure made during operation of the determination device (10), with this procedure including the following steps:

detecting the angular position ($\theta_0$) near the reference angular position;

detecting a "turn cue" pulse; and assigning the offset value ($\theta_{offset}$) to the value of the absolute angular position ($\theta_a$) of the multipole ring (11).

13. A measuring method according to claim 12, further comprising the following steps after the initialization procedure:

continuously counting the signals (A, B) derived from the sensor; and continuously reflecting any variation in the relative angular position ($\theta_r$) on the absolute angular position ($\theta_a$) of the multipole ring (11).

14. A measuring method according to claim 12, further comprising the steps, prior to the detection of the angular position ($\theta_0$) near the reference angular position, of continuously counting the signals (A, B) and continuously determining the relative angular position ($\theta_r$) of the multipole ring (11).

15. A measuring method according to claim 12, wherein the initialization procedure further comprises a step between the detection of the angular position ($\theta_0$) near the reference angular position and the detection of the "turn cue" pulse for assigning the value of the reference angular position to the value of the absolute angular position ($\theta_a$).

16. A measuring method according to claim 12, further comprising the steps:

activating a monitoring system (38) called "local" permanently supplying the sensor (16) with current;

storing the value of the absolute position ($\theta_a$);

continuously counting the signals (A, B) derived from the sensor (16) to measure the variation in the relative position ($\theta_r$) of the multipole ring (11);

deactivating the monitoring system (38); and reflecting the variation in the relative position ($\theta_r$) on the value of the stored absolute position ($\theta_a$).

17. A measuring method according to claim 12, wherein the detection of the angular position ($\theta_0$) near the reference angular position comprises the following steps:

measuring the speed of the vehicle ($V_v$) and comparing it to a first threshold value (S1); and measuring the speeds ($V_g$, $V_d$) of the steered wheels (6, 7) of the vehicle (1) and comparing their difference ($V_{dif}$) to a second threshold value (S2);

with said angular position ($\theta_0$) near the reference angular position being detected if the speed of the vehicle ($V_v$) is greater than the first threshold value (S1), and with the absolute value of the difference ($V_{dif}$) of speeds ($V_g$, $V_d$) of the wheels (6, 7) being in addition less than the second threshold value (S2).

18. A measuring method according to claim 17, wherein the detection of the angular position ($\theta_0$) near the reference angular position further comprises a step of measuring the torque ($\Gamma$) applied to the steering wheel (4) of the vehicle (1) and comparing it to a third threshold value (S3), with said angular position ($\theta_0$) near the reference angular position being detected if, in addition, the value of the torque ($\Gamma$) applied to the steering wheel is less than the third threshold value (S3).

19. A measuring method according to claim 18, wherein the detection of the angular position ($\theta_0$) near the reference angular position further comprises a step of measuring the rotating speed ($V_{vol}$) of the steering wheel (4) of the vehicle (1) and comparing it to the fourth threshold value (S4), with said angular position ($\theta_0$) near the reference angular position being detected if, in addition, the value of the rotating speed ($V_{vol}$) is less than the fourth threshold value (S4).

* * * * *